US012175850B2

(12) United States Patent
Müller et al.

(10) Patent No.: US 12,175,850 B2
(45) Date of Patent: Dec. 24, 2024

(54) PRODUCT ANTI-THEFT SYSTEM AND METHOD FOR OPERATING A PRODUCT ANTI-THEFT SYSTEM

(71) Applicant: rapitag GmbH, Munich (DE)

(72) Inventors: Sebastian Müller, Munich (DE); Alexander Schneider, Munich (DE)

(73) Assignee: rapitag GmbH, Munich (DE)

( * ) Notice: Subject to any disclaimer, the term of this patent is extended or adjusted under 35 U.S.C. 154(b) by 108 days.

(21) Appl. No.: 17/798,590

(22) PCT Filed: Feb. 11, 2021

(86) PCT No.: PCT/EP2021/053272
§ 371 (c)(1),
(2) Date: Aug. 10, 2022

(87) PCT Pub. No.: WO2021/160710
PCT Pub. Date: Aug. 19, 2021

(65) Prior Publication Data

US 2023/0102380 A1 Mar. 30, 2023

(30) Foreign Application Priority Data

Feb. 14, 2020 (DE) ..................... 10 2020 201 865.0

(51) Int. Cl.
*G08B 13/24* (2006.01)
*E05B 73/00* (2006.01)

(52) U.S. Cl.
CPC ...... *G08B 13/2434* (2013.01); *E05B 73/0017* (2013.01)

(58) Field of Classification Search
None
See application file for complete search history.

(56) References Cited

U.S. PATENT DOCUMENTS 5,519,381 A * 5/1996 Marsh ................ G06K 17/0022 340/10.2
5,942,978 A * 8/1999 Shafer ................. E05B 73/0017 70/57.1

(Continued)

FOREIGN PATENT DOCUMENTS

DE 102019204781 A1 10/2020
WO 2020200618 A1 10/2020

OTHER PUBLICATIONS

International Application No. PCT/EP2021/053272 , "International Search Report and Written Opinion (Partial translation)", May 7, 2021, 20 pages.

(Continued)

*Primary Examiner* — K. Wong
(74) *Attorney, Agent, or Firm* — Kilpatrick Townsend & Stockton LLP

(57) ABSTRACT

Disclosed is a product anti-theft system having a product anti-theft device configured to be attached to a product to be secured, the anti-theft device having a housing with a connecting portion designed to be connected to the product to be secured and a locking mechanism associated with the connecting portion and having a secured state and a released state. The anti-theft system further includes a release device for transmitting a release signal that triggers transferring of the locking mechanism from the secured state to the released state. Also disclosed is a method of operating an anti-theft device.

12 Claims, 4 Drawing Sheets

(56) References Cited

U.S. PATENT DOCUMENTS

| | | | | |
|---|---|---|---|---|
| 6,072,383 | A * | 6/2000 | Gallagher, III | G06K 7/10336 342/51 |
| 7,350,655 | B2 * | 4/2008 | Belden, Jr. | B65D 55/14 215/293 |
| 8,441,534 | B2 | 5/2013 | Hubmer et al. | |
| 9,472,073 | B2 * | 10/2016 | Yang | E05B 73/0041 |
| 9,830,791 | B2 | 11/2017 | Trivelpiece et al. | |
| 10,240,368 | B2 * | 3/2019 | Necchi | E05B 73/0041 |
| 11,694,529 | B1 * | 7/2023 | Müller | G08B 13/246 340/539.31 |
| 2009/0198529 | A1 * | 8/2009 | Burkholder | G08B 13/2482 705/28 |
| 2013/0321153 | A1 | 12/2013 | Yang | |

OTHER PUBLICATIONS

German Application No. 10 2020 201 865.0, German Search Report mailed Feb. 17, 2021, 6 pages.

* cited by examiner

PRODUCT ANTI-THEFT SYSTEM AND METHOD FOR OPERATING A PRODUCT ANTI-THEFT SYSTEM

CROSS REFERENCE TO RELATED APPLICATIONS

This application is a U.S. national phase of International Patent Application No. PCT/EP2021/053272 filed on Feb. 11, 2021, which claims priority to German Patent Application No. 10 2020 201 865.0, filed in Germany on Feb. 14, 2020. The entire contents of both applications are hereby incorporated herein by this reference.

The invention relates to a product anti-theft system and to a method for operating a product anti-theft system.

Product anti-theft systems are known which comprise a product anti-theft device that is configured to be attached to a product to be secured and a release device that is configured to open the product anti-theft device so that the product anti-theft device is allowed to be removed from the product to be secured.

If such product anti-theft systems comprise product anti-theft devices which are intended to be attached to bottles, then these are usually closure devices, for example "bottle caps" or "bottle locks". However, it should already be pointed out at this point that although the invention will be explained in part using the example of closure devices for the sake of simplicity, no restriction of any kind can be derived from this.

Due to the fact that such closure devices can be attached to a bottle cap, they have the advantage of being able to prevent, in addition to theft per se, i.e. the removal without permission of the product to be secured together with the closure device from a publicly accessible retail area of a department store, the bottle from being opened without permission within this retail area.

For this purpose, such closure devices of the type in question have, on the one hand, an anti-theft element, for example an RFID chip or an EAS (electronic article surveillance) element, which is configured to interact with an external anti-theft system, for example a transceiver unit for electromagnetic radiation of a suitable wavelength, so that, if someone passes by the closure device equipped with the RFID chip or the EAS element, a signal is generated and an alarm can be triggered.

On the other hand, unauthorised removal of the closure device from the bottle to be secured must be prevented, which is why a locking mechanism is generally also provided on closure devices of the type in question, which mechanism is designed and intended, in a locked state, i.e. a secured state of the locking mechanism, to ensure a substantially non-detachable engagement between the closure device and the bottle to be secured.

In order to remove a closure device attached in this way, release devices are usually provided in the service or checkout area of the department store that can usually only be operated by the retail staff, are magnet-based, for example, or are operated mechanically in another way and are designed and intended to unlock the locking mechanism of the closure device in the secured state, i.e. to transfer said mechanism into a released state so that the closure device can be removed from the corresponding bottle.

However, unlocking and removing the closure devices which comprise a magnet-based locking mechanism usually proves to be particularly time-consuming and strenuous, which represents a challenge that should not be underestimated, especially for inexperienced cashiers, and can lead to unpleasantly long waiting times in department stores, especially at peak times. It is not only for this reason that such closure devices are also hardly suitable for "self-checkout systems", since, in addition to being unfavourable to handle, they can also be easily manipulated in that they can be opened and removed without permission using a magnet on someone's person.

It is therefore the object of the present invention to provide a remedy here.

This object is achieved according to the invention by a product anti-theft system comprising:

- a product anti-theft device which is configured to be attached to a product to be secured, in particular bottles, the product anti-theft device comprising:
  - a housing having a connection portion which is designed and intended to be connected to the product to be secured,
  - a locking mechanism which is associated with the connection portion and has a secured state in which the connection portion non-detachably engages with the product to be secured, and a released state in which the connection portion is allowed to be detached from the product to be secured, and
  - a release signal receiving unit which is operatively coupled with the locking mechanism and is configured, upon receipt of a release signal, to cause the locking mechanism to be transferred from the secured state into the released state; and
- a release device which comprises a release signal transmission unit and is designed and intended to define a release region and to transmit the release signal, wherein the product anti-theft device is configured to transfer the locking mechanism from the secured state into the released state when the product anti-theft device receives the release signal in the release region.

Since the product anti-theft system according to the invention comprises the release device having the release signal transmission unit, the locking mechanism of the product anti-theft device can be transferred from the secured state into the released state simply via the transmission of the release signal and the reception of this release signal via the release signal receiving unit when the product anti-theft device is in the release region, without the need for time-consuming and/or strenuous handling or the need to provide a tool for manual unlocking that is specially adapted to the product anti-theft device. If the product anti-theft device according to the invention is for a bottle, it is preferable for the product anti-theft device to be designed as a closure device. Such a closure device is described, for example, in the applicant's German patent application with the official file reference 10 2019 204 781.5.

The release region is a spatial region which is preferably defined by the transmission power of the release signal transmission unit. The release signal transmission unit can continuously transmit the release signal. Furthermore, the release signal transmission unit can be configured to transmit the release signal in such a way that it can only be received by the release signal receiving unit if the product anti-theft device is within a radius of no more than 150 cm, preferably no more than 50 cm, particularly preferably no more than 30 cm from the release signal transmission unit. In addition, the release device is preferably arranged in a spatially stationary manner.

Alternatively, the release region can also be defined by a transit time that a release signal transmitted by the release signal transmission unit requires until it reaches the release device again as a signal reflected by the product anti-theft device.

In principle, the release signal can be a universal release signal so that each product anti-theft device from which the release signal is received in the release region is opened. Although this is a simple and quite cost-effective solution, there is a risk in this case that the universal release signal will be intercepted, saved and used by a third-party reader to open further product anti-theft devices in an unauthorised manner. In order to counter this circumstance, according to an embodiment of the product anti-theft system according to the invention, the product anti-theft device also comprises an identification signal transmission unit which is designed and intended to transmit a security ID of the product anti-theft device and/or a product ID of the product to be secured, the release device also comprises an identification signal receiving unit which is designed and intended to receive the security ID and/or the product ID, and the release signal transmission unit of the release device is also designed and intended to transmit the release signal which corresponds to the security ID and/or the product ID.

The release signal is preferably an encrypted signal. In addition, it may be the case that the release signal in this context is intended to open a single anti-theft device or a predetermined number of anti-theft devices which in particular each secure similar, preferably identical, products. It is also advantageous in this context if the product anti-theft device comprises a memory on which the security ID of the product anti-theft device and/or the product ID of the product secured thereby, for example in the form of a multi-digit character code, is stored. If only the security ID is stored in this memory, it may also be the case that the product ID of the product secured by a specific product anti-theft device is stored on a server which is in communication connection with the release device.

In a development of this embodiment, the release signal transmission unit can also be designed and intended to transmit the release signal only if the security ID and/or the product ID meets a predetermined condition. This predetermined condition can, for example, comprise a payment status, a youth protection status, a reservation status or the like. In this context, the release signal transmission unit can also be designed and intended to transmit the release signal only if the product has been paid for beforehand and/or a youth protection check delivers a positive result and/or the product is generally released for sale. This can not only be advantageous in the context of "self-checkout systems".

In order to also be able to determine whether the product anti-theft device has been successfully unlocked, the identification signal transmission unit of the product anti-theft device can also be designed and intended to transmit a status signal which indicates whether the locking mechanism of the product anti-theft device is in the secured state or the released state.

In order to also be able to ensure that the release signal is only transmitted when the product anti-theft device is locked or only until the locking mechanism has been successfully transferred from the secured state into the released state, according to a development, the release signal transmission unit, upon receipt of the status signal by the identification signal receiving unit of the release device, is also designed and intended to transmit the release signal only if the locking mechanism is in the secured state. If, on the other hand, a product anti-theft device of which the locking mechanism is in the secured state cannot be opened when the release signal is transmitted, the release device can also be designed to output an error message. For this purpose, the release device can be suitably coupled with an optical and/or acoustic display apparatus.

Especially in the context of "self-checkout systems", it is often necessary for a customer to first detect the secured product themselves, i.e. to scan it, in order to then be able to pay for it at a checkout terminal or by means of an app stored on a mobile terminal, such as a smartphone. In order for the product anti-theft device to be able to be removed from the secured product in a particularly simple and time-efficient way in this application as well, according to a further embodiment, the release device also has a signal input which is connected to a signal output of a detection unit, the detection unit being designed and intended to detect a security ID of the product anti-theft device and/or a product ID of the product to be secured, and the release signal transmission unit also preferably being designed and intended to transmit the release signal only if the security ID and/or the product ID meets a predetermined condition.

In principle, the detection unit can be connected to the release device in a wired or wireless manner. In the last-mentioned embodiment, too, the predetermined condition can comprise a payment status, a youth protection status, a reservation status or the like, reference being made in detail to the above explanations.

In order to also allow the product or the product anti-theft device securing this product to be detected as easily as possible, in a development of this embodiment, the detection unit is designed as an optical detection unit, for example a barcode scanner, and/or an RFID detection unit.

Furthermore, it can be advantageous in the context of "self-checkout systems" if the release device is associated with and/or integrated in a mobile terminal, for example a smartphone or a smartwatch. It would thus be conceivable, for example, to transmit the release signal directly from the mobile terminal to the product anti-theft device, i.e. from any location.

Particularly in the context of checkouts to be operated by retail staff, such as those known from department stores, supermarkets or discounters, it seems desirable that the product anti-theft device is released, i.e. the locking mechanism is transferred from the secured state into the released state in the vicinity of such a checkout, preferably under the supervision of the retail staff. According to a further embodiment of the product anti-theft system according to the invention, the release device is associated with a checkout system and is preferably designed as a unit which is designed and intended to be arranged on or in the checkout system and to be communicatively connected thereto.

If the release device is associated with the checkout system, it is also advantageous if the product anti-theft device is released at the latest while the secured product together with the product anti-theft device are being scanned by the retail staff, or has already been released before the secured product together with the product anti-theft device are handled by the retail staff. According to a development of this embodiment, the release device is also designed and intended to be arranged on or below a product support apparatus or a product conveyor apparatus, for example a product conveyor belt, of the checkout system. The locking mechanism can thus be transferred from the secured state into the released state as soon as the customer has placed the secured product on the product support apparatus or the product conveyor apparatus.

In order to also be able to provide a reliable and low-maintenance energy supply for the product anti-theft device, it comprises an energy supply unit, for example a preferably rechargeable battery, and/or an energy recovery unit, preferably a solar cell.

As already mentioned briefly above, the product anti-theft device can also comprise an anti-theft element, for example an electronic article security element.

According to a further aspect, the invention relates to a method for operating a product anti-theft system, comprising the following steps:

a) attaching a product anti-theft device to the product to be secured, b) transferring the product anti-theft device into a secured state so that the product anti-theft device non-detachably engages with the product to be secured, c) moving the product anti-theft device into a release region which is defined by a release signal transmission unit of a release device, d) transmitting, via the release signal transmission unit, the release signal, e) receiving, via a release signal receiving unit of the product anti-theft device, the release signal, and, upon receipt of the release signal, f) transferring the product anti-theft device from the secured state into a released state in which the product anti-theft device is allowed to be detached from the product to be secured, and g) removing the product anti-theft device from the product to be secured.

Already at this point it should be pointed out that all the advantages and effects of the product anti-theft system according to the invention also apply to the method according to the invention, with reference being made in detail to the statements made above with regard to the product anti-theft system.

According to an embodiment, the method according to the invention can also comprise:

c') transmitting, via an identification signal transmission unit of the product anti-theft device, a security ID and/or a product ID to an identification signal receiving unit of the release device, wherein step c') is carried out before step d), wherein the release signal transmitted in step d) corresponds to the security ID and/or the product ID, and wherein the release signal is preferably transmitted, via the release signal transmission unit, only if the security ID and/or the product ID meets a predetermined condition.

Alternatively, the method according to the invention can also comprise:

c") detecting, via a detection unit, a security ID and/or a product ID, wherein step c") is carried out before step d), wherein the release signal transmitted in step d) corresponds to the security ID and/or the product ID, and wherein the release signal is preferably transmitted, via the release signal transmission unit, only if the security ID and/or the product ID meets a predetermined condition.

Further features and advantages of the present invention will become clear from the following description of embodiments thereof when considered together with the accompanying drawings. In detail, in the drawings.

Figure 1A:
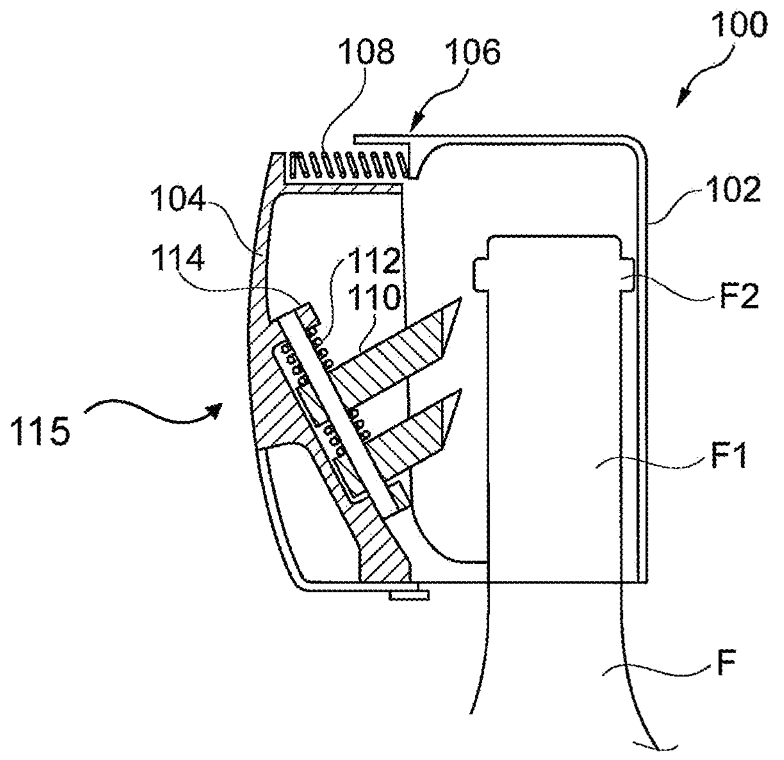
FIGS. 1A and 1B show a product anti-theft device designed as a closure device for a product anti-theft system according to the invention.
Figure 1B:
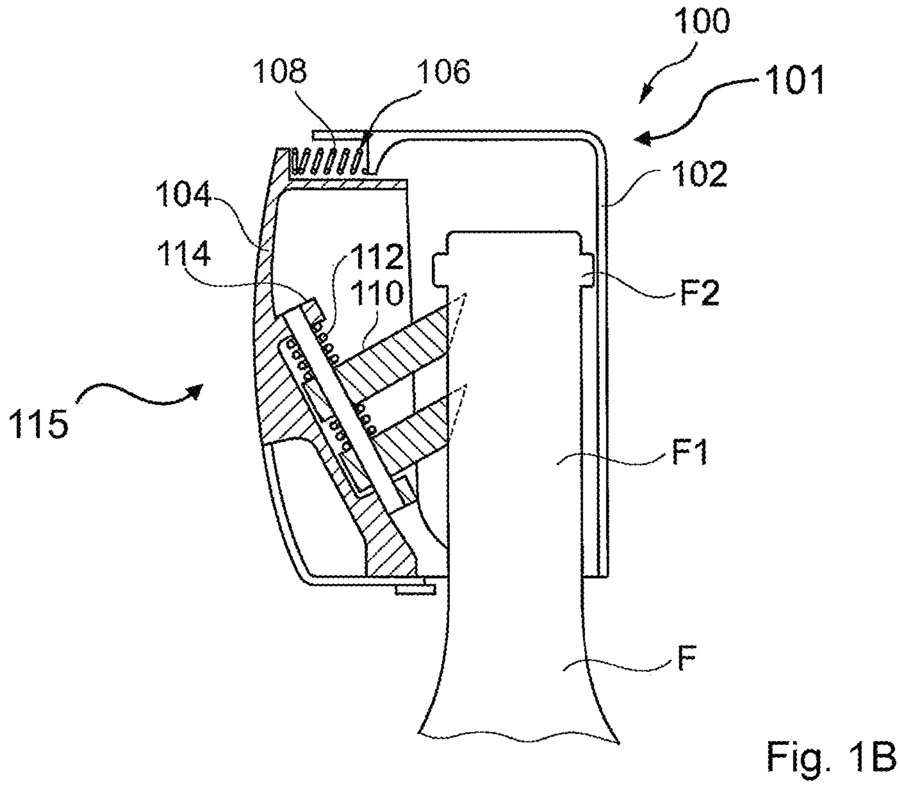

In FIGS. 1A and 1B, an exemplary product anti-theft device for an anti-theft system according to the invention is denoted by 100. In the embodiment shown, the product anti-theft device 100 is designed as a closure device.

The basic structure of the closure device 100 is explained in detail in the applicant's German patent application with the official file reference 10 2019 204 781.5, the description of which is hereby expressly referred to and which in this respect is made part of the disclosure of the present application.

With further reference to FIGS. 1A and 1B, the closure device 100 comprises a housing 101 which comprises a first housing part 102 and a second housing part 104. The housing parts 102 and 104 are interconnected by a sliding guide 106 so that they can move linearly relative to one another.

In the state shown in FIG. 1A, the first housing part 102 and the second housing part 104 are in a released position, in which they are at a maximum distance from one another. The two housing parts 102 and 104 are also preloaded by a spiral spring 108 into the released position shown in FIG. 1A. Furthermore, it can be seen that the closure device 100 is placed on a bottleneck F1 of a bottle F, which also has a bead F2 at the upper end in the region of its bottle cap.

In order to non-detachably attach the closure device 100 in a secured position shown in FIG. 1B via an engagement with this bead F2, the closure device 100 also associated with the second housing part 104 comprises a barb element 110 which in a manner extends obliquely from bottom to top on the bottleneck F1 such that said barb element rests against the bead F2 from below in the state shown in FIG. 1B and prevents the closure device 100 from being pulled upwards from the bottleneck F1. The barb element 110, which is displaceably mounted on a linear guide 114, is preloaded by another spiral spring 112 in the direction of the bottleneck F1 so that the barb element rests securely on the bottleneck F1 in the secured state from FIG. 1B and thus the closure device 100 is securely fixed to the bottle F; however, via a deflection of the barb element 110 against the action of the spiral spring 112, it is possible for the closure device 100 to be slipped onto the bottleneck F1 even when the closure device 100 is in the secured position, since the barb element 110 is first deflected away from the bottleneck F1 via the bead F2 against the action of the spiral spring 112 and can come to rest behind the bead F2 when said bead is brushed over.

The housing part 104 thus forms, together with the barb element 110, the spiral spring 112 and the linear guide 114, a connection portion which is generally denoted by the reference numeral 115.

Figure 2A:
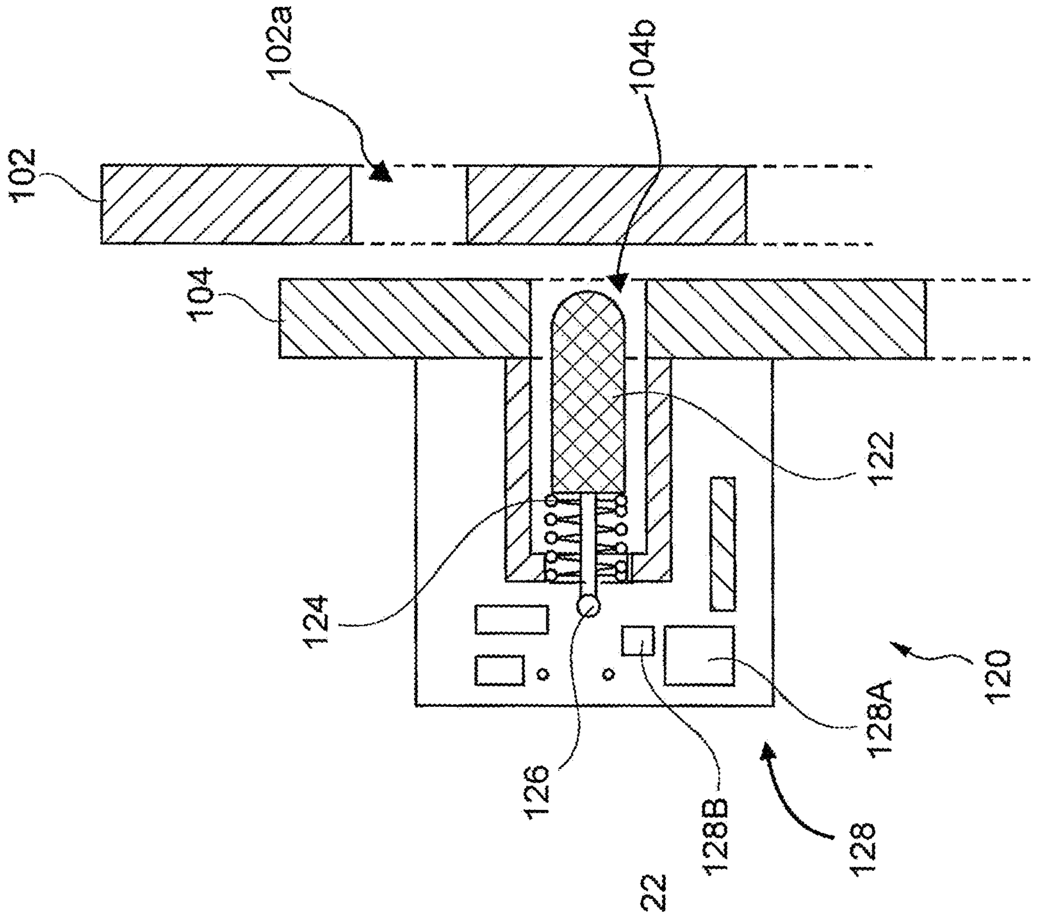
FIGS. 2A and 2B show a detailed view of a locking mechanism for the closure device from FIGS. 1A and 1B in a released state and a secured state.
Figure 2B:
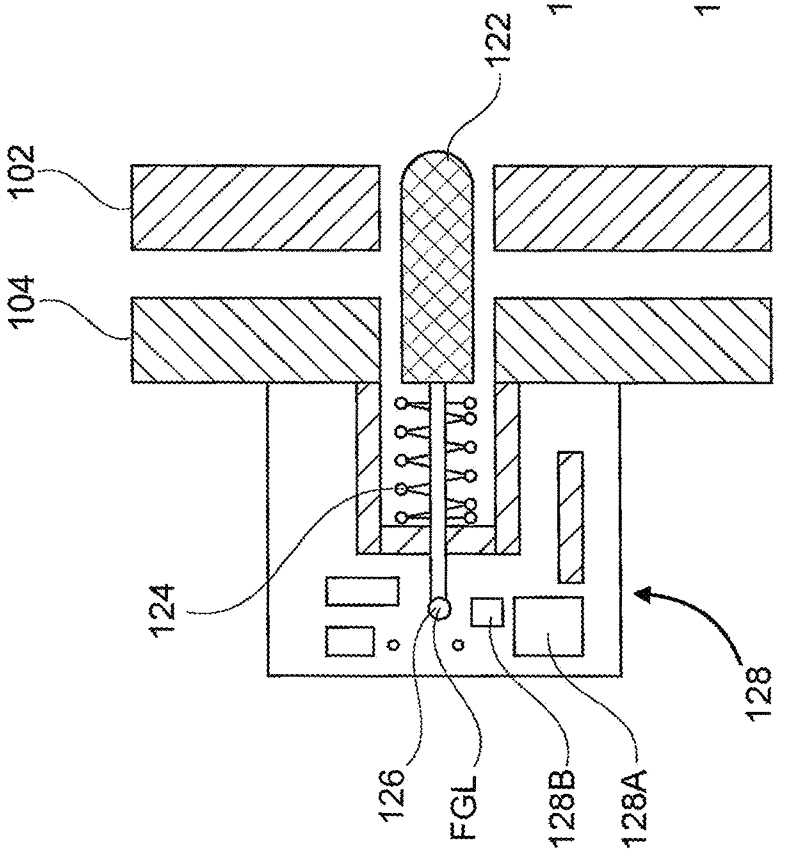

In FIGS. 2A and 2B, a locking mechanism which is used in the closure device 100 and by means of which the housing parts 102 and 104 can be fixed to one another in the secured position is shown and denoted by the reference numeral 120.

FIG. 2A shows the locking mechanism 120 in a released state, which corresponds to the released position of the closure device 100, while FIG. 2B shows the same closure mechanism 120 in a secured state, which corresponds to the secured position of the closure device 100.

Respective openings 102*a* and 104*a* are provided in the two housing parts 102 and 104, through which the locking pin 122 extends in the secured state in order to fix the relative position between the first and the second housing part 102 and 104. In contrast, in FIG. 2A the locking pin 122 only protrudes into the opening 104*a* of the second housing part 104, to which the locking mechanism 120 is attached, so that it can be seen that a relative movement between the first housing part 102 and the second housing part 104 is possible without any problems.

In addition to the locking pin 122 already mentioned, the locking mechanism 120 also comprises a spiral spring 124, via which the locking pin 122 is preloaded into the engagement position shown in FIG. 2B. If the locking pin 122 is now moved out of engagement with the first housing part 102 against the action of the spiral spring 124, i.e. transferred from the state from FIG. 2B into the state from FIG. 2A, then a shape memory alloy (SMA) 126 acting as an actuating element must be used to contract in order to displace the locking pin 122 away from the first housing part 102 until it emerges from the opening 102*a*.

In order to initiate this actuation, the locking mechanism 120 also comprises electronic components 128, in particular a release signal receiving unit 128A, by means of which release signals can be received, and a battery 128B which supplies the energy for the operation of the release signal receiving unit 128A and the shape memory alloy 126.

Figure 3:
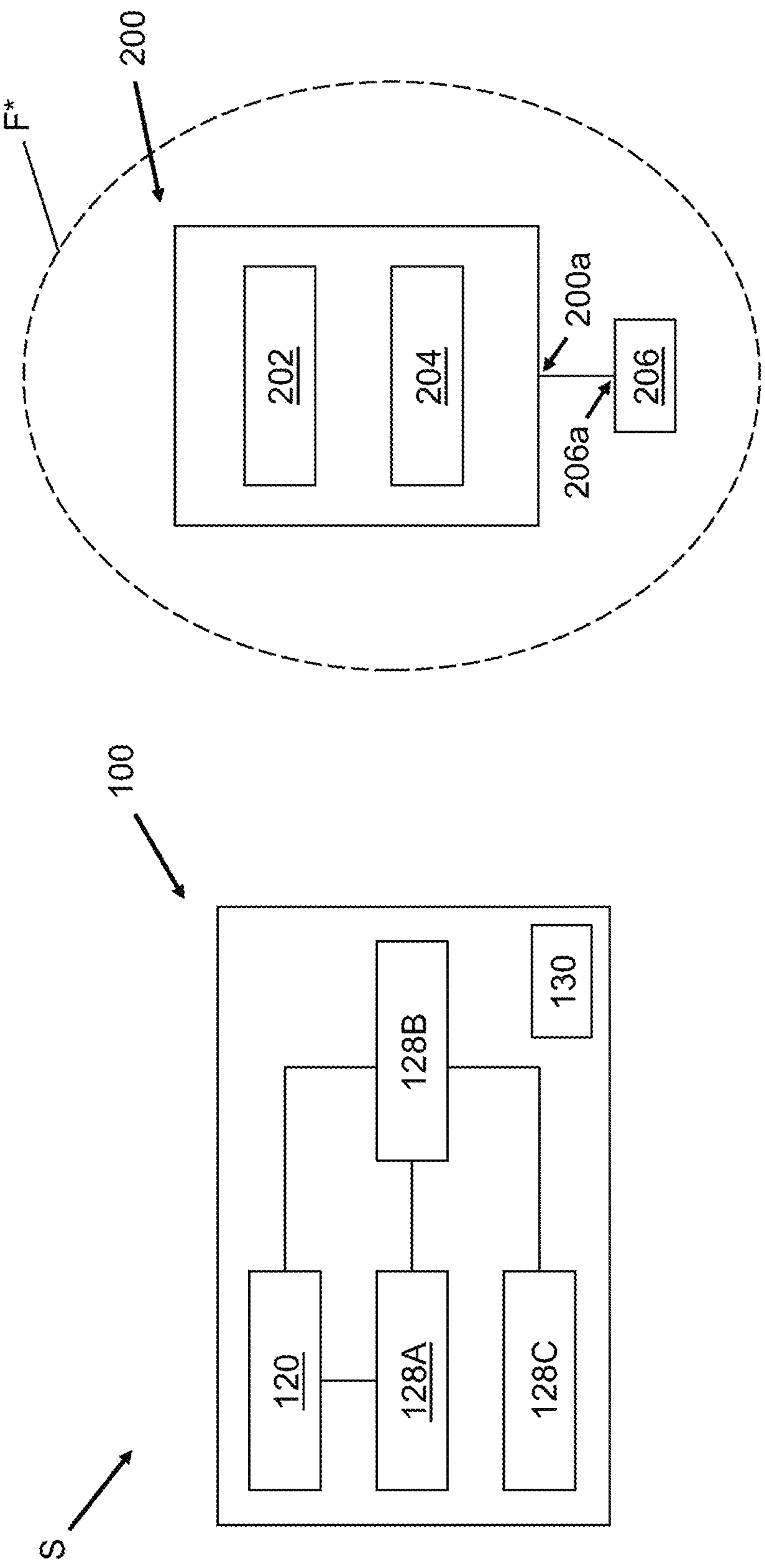
FIG. 3 shows a schematic view of a product anti-theft system according to the invention.

FIG. 3 now shows a schematic view of the product anti-theft system S according to the invention. The product anti-theft system S comprises the closure device 100 already described above, which is however only indicated schematically in FIG. 3, and a release device 200.

The release device 200 in turn comprises a release signal transmission unit 202 which is designed and intended to define a release region F*, which is only identified by dashed lines in FIG. 3. The release region F* can be defined by a predetermined distance from the release device 200, which, for example, corresponds to approximately 30 cm. At this point, however, it should be pointed out that the release region F* does not have to be defined by round or oval boundary lines but can also be a different spatially designed region. In addition, the release signal transmission unit 202 is configured to transmit a release signal which can be received by the release signal receiving unit 128A mentioned above when the closure device 100 is within the release region F* or is moved therein. The release signal receiving unit 128A of the closure device 100 is in turn operatively connected to the closure mechanism 120, also explained above, so that the locking mechanism 120 can be transferred from the secured state into the released state upon receipt of the release signal via the release signal receiving unit 128A. This in turn means that the connection portion 115 described above can be moved into the released position via the action of the spring 108 so that it no longer engages with the bottle F and the closure device 100 can be removed from the bottle.

In order to be able to ensure that only certain closure devices are opened via the release signal or the release signal is only transmitted when at least one predetermined condition is met, the closure device 100 in the embodiment shown in FIG. 3 also comprises an identification signal transmission unit 128C which is designed and intended to transmit a security ID of the closure device 100 or a product ID of the secured bottle F, which can be received by an identification signal receiving unit 204 of the release device 200. As a result, the release device 200 can be designed and intended to transmit a release signal which corresponds to a particular security ID or product ID. The release signal can therefore be intended, for example, only to open the bottle lock that previously transmitted the corresponding security ID or product ID to the identification signal receiving unit 204. In addition, the release signal transmission unit 202 can be designed and intended to transmit the release signal only when the bottle F secured by the closure device 100 has been paid for.

In addition or as an alternative to the identification signal receiving unit 204, a detection unit 206 can also be provided, the signal output 206*a* of which is connected to a signal input 200*a* of the release device 200. The detection unit 206 which is designed, for example, as a barcode scanner or an RFID detection unit can be intended analogously to detect the security ID or the product ID and forward it to the release device 200.

It should also be added that the communication between all transmission and receiver units of the product anti-theft system S can take place, for example, using Bluetooth or a comparable communication standard. In addition, the closure device 100 also comprises an anti-theft element 130, for example an EAS element, which is intended to interact with an anti-theft system not shown in FIG. 3 in such a way that an alarm is sounded when the closure device 100 is removed without authorization from a spatially limited retail area.

Figure 4:
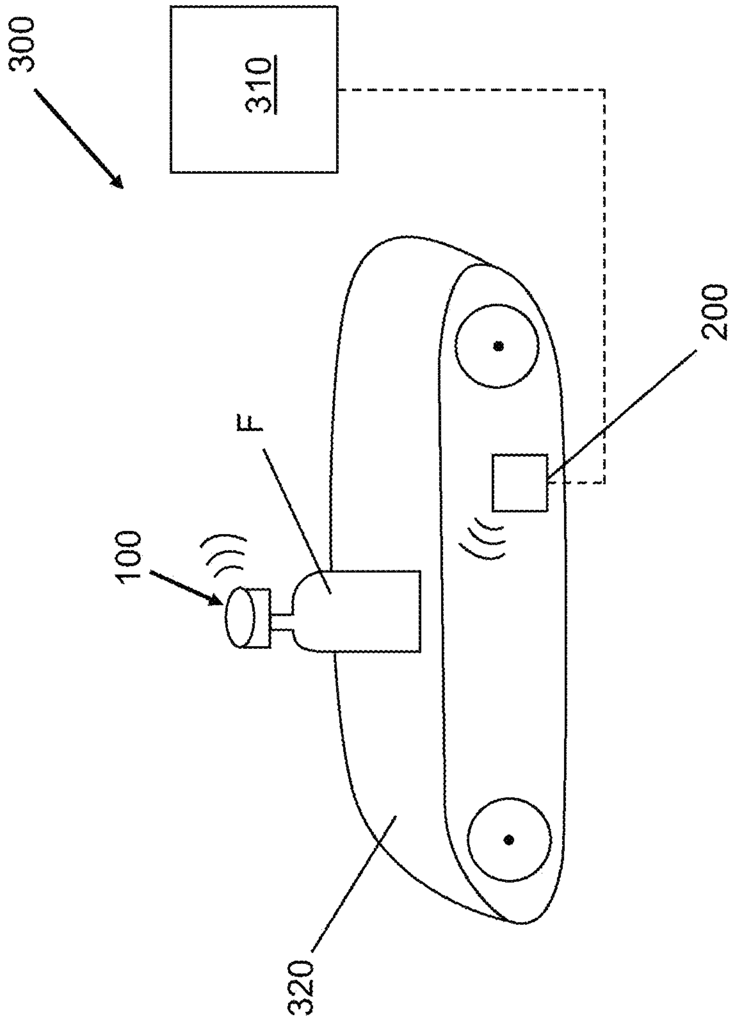
FIG. 4 shows a further schematic view of the product anti-theft system according to the invention, which is integrated in a checkout system.

Finally, FIG. 4 shows a further schematic view of the product anti-theft system S according to the invention, which is integrated in a checkout system 300. The checkout system 300 can in principle be a standard checkout system, which is used, for example, in department stores, supermarkets or discounters. In the embodiment shown, the release device 200 is arranged below a product conveyor belt 320 of the checkout system 300 and is communicatively connected to a checkout 310. As a result of this, the closure device 100 can be unlocked, i.e. transferred into the released position as soon as it has been deposited on the product conveyor belt 320 and has received the release signal from the release device 200. Thus, the closure device 100 must only be removed by the staff handling the checkout 310, which makes the unlocking process noticeably easier.

The invention claimed is:

1. Product anti-theft system comprising:

a product anti-theft device which is configured to be attached to a product to be secured, the product anti-theft device comprising:

a housing having a connection portion configured to be connected to the product to be secured;

a locking mechanism which is associated with the connection portion and has a secured state in which the connection portion non-detachably engages with the product to be secured, and a released state in which the connection portion is allowed to be detached from the product to be secured; and a release signal receiving unit which is operatively coupled with the locking mechanism and is configured, upon receipt of a release signal, to cause the locking mechanism to be transferred from the secured state into the released state;

and a release device which comprises a release signal transmission unit and is configured to define a release region and to transmit the release signal, wherein the product anti-theft device is configured to transfer the locking mechanism from the secured state into the released state when the product anti-theft device receives the release signal in the release region, wherein the release region is a spatial region which is defined by a predetermined distance from the release device, and wherein the release device is associated with a checkout system and is configured to be arranged on or below a product support apparatus or a product conveyor apparatus, such that the locking mechanism is configured to be transferred from the secured state into the released state as soon as the product to be secured is arranged within the release region.

2. Product anti-theft system according to claim 1, wherein the product anti-theft device further comprises an identification signal transmission unit configured to transmit a security ID of the product anti-theft device and/or a product ID of the product to be secured, and the release device further comprises an identification signal receiving unit configured to receive the security ID and/or the product ID, and the release signal transmission unit of the release device is configured to transmit the release signal which corresponds to the security ID and/or the product ID.

3. Product anti-theft system according to claim 2, wherein the release signal transmission unit is configured to transmit the release signal only if the security ID and/or the product ID meets a predetermined condition.

4. Product anti-theft system according to claim 2, wherein the identification signal transmission unit of the product anti-theft device is configured to transmit a status signal which indicates whether the locking mechanism of the product anti-theft device is in the secured state or the released state.

5. Product anti-theft system according to claim 4, wherein the release signal transmission unit, upon receipt of the status signal by the identification signal receiving unit of the release device, is configured to transmit the release signal only if the locking mechanism is in the secured state.

6. Product anti-theft system according to claim 1, wherein the release device has a signal input which is connected to a signal output of a detection unit, the detection unit being configured to detect a security ID of the product anti-theft device and/or a product ID of the product to be secured, and the release signal transmission unit is configured to transmit the release signal only if the security ID and/or the product ID meets a predetermined condition.

7. Product anti-theft system according to claim 6, wherein the detection unit is designed as an optical detection unit, for example a barcode scanner, and/or an RFID detection unit.

8. Product anti-theft system according to claim 1, further comprising an energy supply unit and/or an energy recovery unit.

9. Product anti-theft system according to claim 1, wherein the product anti-theft device comprises an anti-theft element.

10. Method for operating a product anti-theft system, the method comprising the following steps:

a) attaching a product anti-theft device to the product to be secured;

b) transferring the product anti-theft device into a secured state so that the product anti-theft device non-detachably engages with the product to be secured;

c) moving the product anti-theft device into a release region which is defined by a release signal transmission unit of a release device, wherein the release region is a spatial region which is defined by a predetermined distance from the release device, and wherein the release device is associated with a checkout system and is arranged on or below a product support apparatus or a product conveyor apparatus;

d) transmitting, via the release signal transmission unit, the release signal;

e) receiving, via a release signal receiving unit of the product anti-theft device, the release signal, as soon as the product to be secured is arranged within the release region and, upon receipt of the release signal;

f) transferring the product anti-theft device from the secured state into a released state in which the product anti-theft device is allowed to be detached from the product to be secured; and g) removing the product anti-theft device from the product to be secured.

11. Method for operating a product anti-theft system according to claim 10, the method further comprising:

c') transmitting, via an identification signal transmission unit of the product anti-theft device, a security ID and/or a product ID to an identification signal receiving unit of the release device, wherein step c') is carried out before step d), wherein the release signal transmitted in step d) corresponds to the security ID and/or the product ID, and wherein the release signal is transmitted, via the release signal transmission unit, only if the security ID and/or the product ID meets a predetermined condition.

12. Method for operating a product anti-theft system according to claim 10 the method further comprising:

c") detecting, via a detection unit, a security ID and/or a product ID, wherein step c") is carried out before step d), wherein the release signal transmitted in step d) corresponds to the security ID and/or the product ID, and wherein the release signal is transmitted, via the release signal transmission unit, only if the security ID and/or the product ID meets a predetermined condition.

* * * * *